(12) United States Patent
Song et al.

(10) Patent No.: US 8,153,324 B2
(45) Date of Patent: Apr. 10, 2012

(54) CONTROLLED-RELEASE VAPOR FUEL CELL

(75) Inventors: Lulu Song, Centerville, OH (US);
Jiusheng Guo, Centerville, OH (US);
Aruna Zhamu, Centerville, OH (US);
Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 1438 days.

(21) Appl. No.: 11/353,463

(22) Filed: Feb. 15, 2006

(65) Prior Publication Data
US 2007/0190379 A1 Aug. 16, 2007

(51) Int. Cl.
*H01M 8/04* (2006.01)
(52) U.S. Cl. ......... 429/457; 429/434; 429/443; 429/444
(58) Field of Classification Search .................... 429/17, 429/457, 434, 443
See application file for complete search history.

(56) References Cited

U.S. PATENT DOCUMENTS

| | | |
|---|---|---|
| 4,016,129 A | 4/1977 | Miyosawa |
| 5,783,324 A | 7/1998 | Binder et al. |
| 6,127,058 A | 10/2000 | Pratt et al. |
| 6,447,941 B1 | 9/2002 | Tomimatsu et al. |
| 6,635,104 B2 * | 10/2003 | Komkova et al. .................... 96/4 |
| 6,811,905 B1 | 11/2004 | Cropley et al. |
| 2004/0265680 A1 * | 12/2004 | Ren et al. ......................... 429/44 |

OTHER PUBLICATIONS

J. Kallo, et al. "Conductance and Methanol Crossover Investigation of Nafion membranes in a Vapor-Fed DMFC ," J. of the Electrochemical Soc., 150 (6) (2003) pp. A765-A769.
U.S. Appl. No. 10/762,626, filed Jan. 23, 2004, Yang et al.
U.S. Appl. No. 11/257,528, filed Oct. 26, 2005, Guo et al.

* cited by examiner

*Primary Examiner* — Jane Rhee

(57) ABSTRACT

A controlled-release fuel cell comprising (a) a proton exchange membrane having a first surface and a second surface, a fuel electrode or anode being coupled to the first surface, and an oxidant electrode or cathode being coupled to the second surface; (b) a fuel flow field plate having surface channels positioned in front of the anode with the channels containing therein a controlled-release material that retains a liquid fuel at or below an ambient temperature, but releases the fuel at a temperature higher than an activation temperature to deliver a fuel vapor to the anode; (c) heating means in heat-supplying relation to the controlled-release material to activate fuel vapor release on demand at a desired rate; and (d) fuel supply means that feeds the liquid fuel to the controlled-release material. The invented fuel cell is compact and lightweight, with significantly reduced fuel crossover and improved fuel utilization efficiency. The fuel cell is particularly useful for powering small vehicles and portable devices such as a notebook computer, a personal digital assistant, a mobile phone, and a digital camera.

21 Claims, 6 Drawing Sheets

CONTROLLED-RELEASE VAPOR FUEL CELL

This invention is a result of a research project supported in part by the NSF SBIR-STTR program.

FIELD OF THE INVENTION

This invention relates to an organic vapor fuel cell (OVFC) operating on a hydrogen-rich organic or hydrocarbon fuel that is fed into the fuel cell initially in a liquid form, but is converted into a vapor form prior to coming in contact with the anode electro-catalyst phase. The invention specifically relates to fuel cells such as the direct methanol fuel cell (DMFC) and the direct ethanol vapor fuel cell (DEFC) that are operated at relatively high temperatures (e.g., 80-160° C. for DMFC).

BACKGROUND OF THE INVENTION

A fuel cell converts the chemical energy into electricity. A fuel cell differs from a battery in that the fuel and oxidant of a fuel cell are supplied from sources that are external to the cell, which can generate power as long as the fuel and oxidant are supplied. A particularly useful fuel cell for powering portable electronic devices and light-duty vehicles is a direct methanol fuel cell (DMFC) in which the fuel is a liquid methanol/water mixture and the oxidant is air or oxygen. Protons are formed by oxidation of methanol and water at the anode (fuel electrode). Protons then pass through a proton-exchange membrane (PEM) from the anode to the cathode (oxidant electrode). Electrons produced at the anode in the oxidation reaction flow in the external circuit to the cathode to do useful work.

The electrochemical reactions occurring in a direct methanol fuel cell which contains an acid electrolyte may be illustrated as follows:

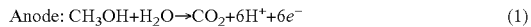
$$\text{Anode: } CH_3OH + H_2O \rightarrow CO_2 + 6H^+ + 6e^- \quad (1)$$

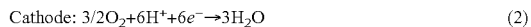
$$\text{Cathode: } 3/2 O_2 + 6H^+ + 6e^- \rightarrow 3H_2O \quad (2)$$

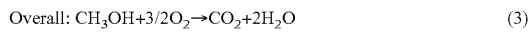
$$\text{Overall: } CH_3OH + 3/2 O_2 \rightarrow CO_2 + 2H_2O \quad (3)$$

The DMFC and other proton-exchange membrane fuel cells (PEMFCs) typically use a hydrated sheet of a perfluorinated acid-based ionomer membrane as a solid electrolyte. The electrodes, each typically containing a catalyst phase (usually a thin catalyst layer), are intimately bonded to two sides of the membrane. This membrane is commercially available from DuPont (under the trade name Nafion®), among several other suppliers. Many catalysts to promote methanol oxidation (Reaction 1) have been evaluated. Examples include: (1) noble metals, (2) noble metal alloys, (3) alloys of noble metals with non-noble metals, (4) chemisorbed layers on Pt, (5) platinum with inorganic material, and (6) redox catalysts. Based on literature reports, Pt—Ru appears to be the best methanol-oxidation catalyst in an acidic electrolyte environment.

The methanol/water fed to a DMFC may be in the liquid or vapor phase. If fuel cells using liquid fuel are available in small size, they would be able to power small-sized electronic devices for a long time. However, conventional DMFCs require pumps and blowers to feed liquid fuel to the fuel cell. The resulting power system is complex in structure and large in size. One way to overcome this problem is to utilize capillary action to feed liquid fuel, without using a liquid delivery pump. However, a fuel cell of this type still has the following disadvantages: (1) poor performance due to low electrode reactivity and (2) low fuel utilization efficiency due to methanol crossover from the anode through the electrolyte membrane to the cathode. This problem of methanol crossing over without being reacted is relatively more severe in a fuel cell with a pressurizing pump than in one without a pump.

Methanol vapor cells that operate at higher temperatures are advantageous in that the step of methanol ionization to produce protons (e.g., Reaction (1)) proceeds more rapidly in these cells. Presumably, a higher temperature results in a higher catalytic electrode activity and the faster reaction leads to a reduction in fuel crossover. However, in the conventional DMFC of a vapor feed type, methanol (as a liquid fuel) is introduced by a pump into a vaporizer which vaporizes methanol with the resulting methanol vapor then being fed to the fuel cell by a blower. Unconsumed methanol vapor discharged from the outlet of the fuel electrode is recycled to the methanol tank through a condenser. This process needs a complex system (including a pump, a vaporizer, a blower, and a condenser) and, hence, is not suitable for powering small-sized electronic devices.

Tomimatsu, et al. (U.S. Pat. No. 6,447,941, Sep. 10, 2002) disclosed a fuel cell in the form of stacked unit cells. In this fuel cell stack, a liquid fuel is introduced into each unit cell by the capillary action and evaporated in each unit cell in a fuel evaporating layer, so that the fuel electrode is supplied with the evaporated fuel. This is a very interesting fuel cell design since it makes use of two sound approaches: liquid feed by capillary action and vapor state reaction. However, the fuel cell configuration is still too complex since each unit cell contains a fuel electrode, an oxidant electrode, an electrolyte plate, a separate liquid-permeating layer, a fuel evaporating layer, and a gas diffusion layer. Furthermore, when the fuel cell is not in operation, the fuel would continue to vaporize even at room temperature, leading to continuous parasitic energy loss. When in operation, the fuel cell relies solely on the electrode reaction-generated heat to help vaporize the liquid fuel passively or in an uncontrolled manner. The resulting fuel vapor supply rate is unsteady or variable over time, leading to a variable voltage and current output.

Our co-workers (Yang and Huang, U.S. Ser. No. 10/762,626, filed Jan. 23, 2004) disclosed a highly efficient direct vapor fuel cell (DVFC) that eliminated some of the drawbacks of the design by Tamimatsu, et al. The DVFC comprises (A) an anode receiving a liquid fuel from a liquid fuel source substantially through diffusion; (B) an electrolyte plate having a first surface adjacent to the anode; and (C) a cathode adjacent to a second surface of the electrolyte plate and opposite to the anode. The anode is provided with a heating environment (e.g., an internally implemented micro heater) to help regulate the vaporization of the liquid fuel inside the anode. In particular, the liquid fuel transported to or near an anode catalyst phase is vaporized locally so that the fuel in a vapor form is ionized very efficiently to produce protons and electrons in a well-controlled manner.

Cropley, et al. (U.S. Pat. No. 6,811,905, Nov. 2, 2004) disclosed an interesting fuel cell structure, which features a vapor diffusion chamber being positioned in front of the anode and a vapor transport member (a sheet of membrane material) being positioned in front of the vapor diffusion chamber. The vapor transport member is substantially impermeable to an organic fuel/water mixture in a liquid phase but is permeable to the mixture in a vapor phase. According to the disclosure, when the fuel cell is in operation, a liquid fuel mixture delivered to the vapor transport member evaporates from the vapor transport member and is delivered to the anode in a vapor form. Cropley, et al. further suggested that the vapor transport member may be selected from pervaporation, permselective, and ionomeric membranes, preferably Nafion® membranes (see Lines 24-50, Column 10 of U.S. Pat. No. 6,811,905). However, there are many drawbacks or shortcomings associated with Cropley's invention, including:

(1) Within the operating temperatures (25°-60° C.) cited by Cropley, et al. (FIG. 6 and FIG. 7 of U.S. Pat. No. 6,811,905), the vapor transport membranes as suggested (e.g., Nafion®) do not allow for significant diffusion rates of the methanol-water mixture, implying that the power-generating rate of these fuel cell systems would be extremely low. Further, very little vapor would be generated at the fuel source side, since the boiling temperatures of methanol and water are 65° C. and 100° C., respectively. The pressure differential between the source side and the sink side (the vapor diffusion chamber) would be very small, providing at best a very small driving force for pervaporation;

(2) The Nafion® membrane (whether being used as a vapor transport membrane or a proton exchange membrane) can not be used at a temperature higher than 80° C. for an extended period of time due to its well-known thermal instability or high propensity to get degraded irreversibly;

(3) Clearly, Cropley, et al. did not recognize the significance of operating a DMFC at a temperature higher than 100° C. DMFCs working at a higher temperature (e.g., 120°-150°) on fuel vapors have the following advantages: (a) the step of methanol ionization to produce protons (e.g., Reaction (1)) proceeds more rapidly in these cells (e.g., J. Kallo, et al. "Conductance and Methanol Crossover Investigation of Nafion membranes in a Vapor-Fed DMFC," J. of the Electrochemical Soc., 150 (6) (2003) PP. A765-A769); (b) a higher temperature results in a higher catalytic electrode activity and the faster reaction leads to a reduction in fuel crossover; and (c) higher operation temperatures could drastically reduce or eliminate CO poisoning of platinum or possibly even allow platinum to be replaced by much less expensive catalysts; and (4) Cropley, et al. did not recognize the issues of differential permeation rates between methanol and water through the vapor transport membrane. The water-to-methanol ratio of the fuel after permeation can be drastically different than that of the fuel before permeation. If the methanol-water mixture is delivered to the anode catalyst site at a ratio significantly different from a desirable ratio (e.g., the stoichiometric ratio as defined by the anode electro-chemical reaction), either excess water or excess methanol will be present at the anode side to still cause the fuel crossover problem. Besides, the composition (methanol-to-water ratio) of the water-methanol mixture at the fuel source side will vary with time. This would result in the methanol-to-water ratio of the fuel delivered to the anode catalyst varying with time, leading to unstable fuel cell operation and undesirable side effects.

To eliminate some of the drawbacks of Cropley's technology, we have conducted an in-depth study of organic vapor fuel cells and developed a new approach (J. Guo, A. Zhamu, and B. Z. Jang, "Organic Vapor Fuel Cell," U.S. patent Ser. No. Pending 11/257,528 (Oct. 26, 2005)). The fuel cell developed comprises the following major components: (a) a membrane electrode assembly, comprising (i) a proton exchange membrane (PEM) sandwiched between (ii) an anode (typically comprising an anode backing layer and an anode electro-catalyst layer) and (iii) a cathode (typically comprising a cathode backing layer and electro-catalyst); (b) a fuel permeation-controlling member positioned in front of the anode, with the member being substantially impermeable to an organic fuel and/or water at or below an ambient temperature, but being permeable to the organic fuel and/or water at a temperature higher than an activation temperature to deliver a permeated fuel fluid (preferably a vapor mixture) to the anode; (c) heating means in heat-supplying relation to the fuel permeation-controlling member to activate the permeation of fuel through the member on demand; and (d) fuel supplier to accommodate and feed the organic fuel and water, separately or as a mixture, to the permeation-controlling member. This organic vapor fuel cell (OVFC) provides well-controlled, steady, reliable, and very impressive current-voltage responses.

However, both the OVFC and Cropley's fuel cell require the implementation of a separate permeation-controlling member (PCM) or vapor transport layer (VTL) between a current collector (a separator or bipolar plate) and an electrically conducting gas diffusion layer (e.g., a carbon paper). If this PCM or VTL is not electrically conductive (which is typically the case), the electrons generated at the anode catalyst site will have to be collected through other means than the current collector, making the fuel cell design awkward. Specifically, either a tab has to be attached to the carbon paper layer, or "fingers" of a current collector have to protrude and traverse across the thickness of the VTL to make electric contacts with the carbon paper. In either scenario, there is a propensity for fuel leakage. A need exists for a fuel cell that operates on an organic vapor/water mixture with a well-controlled vapor generation rate, but no extra vapor-controlling layer that could otherwise compromise the fuel cell stack design ease and flexibility.

Therefore, one object of the present invention is to provide a simple configuration for a fuel cell that operates primarily on organic fuel and water vapors at a fast and well-regulated reaction rate, with significantly reduced fuel crossover.

A specific object of the present invention is to provide a fuel cell that operates on a liquid-fed methanol/water mixture fuel, which is then vaporized at a regulated rate (without the use of a separate vapor-controlling layer) so that the anode catalyst works on fuel vapor rather than liquid.

A further specific object of the present invention is to provide a fuel cell that feeds on a liquid-fed methanol/water mixture but operates at a temperature higher than 100° C.

Another specific object of the present invention is to provide a fuel cell that feeds on a liquid-fed methanol/water mixture at a first water-to-methanol ratio, but operates on a vapor mixture at a second water-to-methanol ratio, which is different from the first ratio. Preferably, this second ratio is closer to the balanced stoichiometric molecular ratio as defined in Eq.(1). This molar ratio is one-to-one in the case of DMFC.

Still another specific object of the present invention is to provide a fuel cell with a stable, constant organic-to-water feed ratio of the vapor mixture that is transported to the anode catalyst phase for oxidation to produce a stable power output.

BRIEF SUMMARY OF THE INVENTION

The present invention provides a light-weight, compact fuel cell that is well-suited to powering portable electronic devices and vehicles, particularly light-duty vehicles such as golf carts, forklifts, wheelchairs, motor bikes, and scooters. The fuel cell comprises the following major components: (a) a membrane electrode assembly, comprising (i) a proton exchange membrane (PEM) sandwiched between (ii) an anode (typically comprising an anode backing layer and an anode electro-catalyst layer) and (iii) a cathode (typically comprising a cathode backing layer and electro-catalyst); (b) a fuel flow field plate having surface channels positioned in front of the anode with the channels containing therein a controlled-release material that absorbs and substantially retains a liquid fuel at or below an ambient temperature, but releases the fuel at a temperature higher than an activation temperature to deliver a fuel vapor to the anode at a desired rate; (c) heating means in heat-supplying relation to the controlled-release material to activate fuel vapor release on demand; and (d) fuel supplier to accommodate and feed the organic fuel and water, separately or as a mixture, to the controlled release material.

A special feature of the presently invented fuel cell is that the fuel (e.g., methanol and water) is supplied initially in a liquid form into the anode compartment. To accomplish this function, the fuel flow channels of a flow field plate comprise therein a controlled-release material being in fluid communication with a liquid fuel source and receiving the liquid fuel therefrom. Specifically, this controlled-release material absorbs liquid fuel and possibly gets swollen to a controlled extent to retain a desired amount of liquid fuel. When the fuel cell is not in operation, this amount of fuel is substantially retained without a parasitic loss at room temperature or below an ambient temperature. When the fuel cell is in operation, heat is supplied to activate the vapor release process, allowing the fuel vapor transport to the anode catalyst phase at a well-controlled rate. The vaporous fuel is oxidized at a higher temperature in a more efficient manner with much reduced methanol crossover. The needed heat may come partially from the electrochemical reactions occurring at the electrodes. Additional heat comes from a heating element positioned near the controlled-release material. During the start-up in real practice, an attendant battery (preferably a rechargeable one) or other small energy source may be operated to energize the heating element that generates the initial amount of heat sufficient to activate the vapor releasing procedure to trigger the operation of the fuel cell. Once the fuel cell begins to operate, it will generate more than enough electricity to not only power the external load but also recharge the battery. Since the electrochemical reactions proceed so efficiently, the amount of power needed to energize the heating element and recharge the battery represents but a very small fraction of the power that can be generated by the invented fuel cell.

Another preferred embodiment of the present invention is a planar fuel cell, comprising: (a) a membrane electrode assembly, comprising one solid electrolyte sheet (or several individual solid electrolyte sheets substantially on the same plane) having a plurality of anodes disposed on only one major side of the solid electrolyte sheet and a plurality of corresponding cathodes disposed on only an opposing major side of the solid electrolyte sheet; (b) a fuel flow field plate positioned in front of the anodes, with this plate containing a controlled-release material in surface flow channels of this plate and facing the anode direction. These channels are in fluid communication with a fuel supply system which feeds liquid fuel to the controlled-release material. This controlled-release material absorbs a controlled amount of liquid organic fuel and/or water and retains this amount at or below an ambient temperature. This material emits vapors of organic fuel and/or water at a temperature higher than an activation temperature to deliver a fuel vapor to the anodes; (c) heating means in heat-supplying relation to the controlled-release material to activate fuel vapor emission on demand; (d) fuel supply means (the fuel supply system) to deliver the organic fuel and water to the controlled-release material; and (e) a plurality of current collectors each having an interconnect means, wherein each of the plurality of anodes and each of the plurality of cathodes has one of the plurality of current collectors associated therewith and the interconnect means are arranged to provide electron transfer between anodes and cathodes.

This planar fuel cell system overcomes several shortcomings of prior art fuel cell stacks. For instance, the need to stack several unit fuel cells together normally requires complex flat stack arrangements and involves numerous parts (gaskets, channels, and bipolar plates, etc.) that may be difficult and expensive to fabricate and assemble. Traditional planar fuel cell stacks based on direct methanol fuel cell units also suffer from low fuel utilization and high fuel cross-over problems, which are overcome by the present invention.

DETAILED DESCRIPTION OF THE INVENTION

Figure 1A:
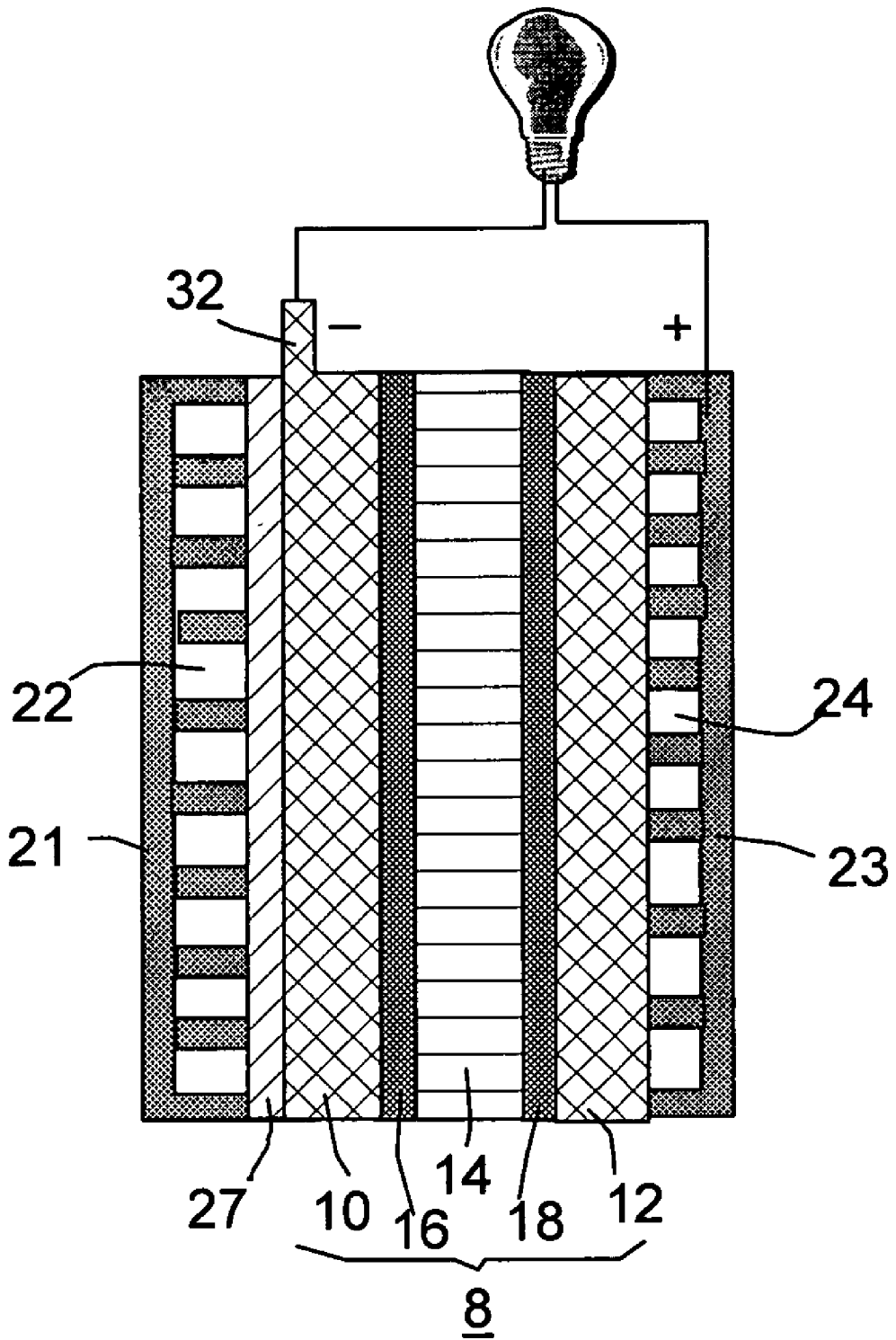
FIG. 1 (A) A cross sectional view of the components of a prior art fuel cell that operates on a fuel vapor evaporated from a separate vapor transport membrane; (B) A cross sectional view of the components of a controlled-release fuel cell.

FIG. 1(A) shows the schematic side view of a prior art organic vapor fuel cell. This cell comprises a membrane electrode assembly 8, which comprises a proton exchange membrane 14 (PEM), an anode bonded to one face of proton exchange membrane, and a cathode bonded to the opposite face of PEM 14. The anode typically includes a platinum/ruthenium electro-catalytic film 16 supported by a backing layer or gas diffusion layer 10 (e.g., carbon paper). The catalytic film or catalyst phase 16 is positioned at the interface between the anode backing layer and PEM 14 for promoting oxidation of the methanol fuel. Similarly, the cathode preferably includes a backing layer 12 (e.g., carbon paper) and a platinum electro-catalytic film 18 positioned at the interface between the cathode backing layer 12 and PEM 14 for promoting reduction of the oxidant. The fuel cell also comprises a pair of fluid distribution plates 21 and 23, which are positioned on opposite sides of membrane electrode assembly 8. Plate 21, which serves as a fuel distribution plate, is shaped to define fuel channels 22 facing towards anode 10. Channels 22 are designed to hold a quantity of a liquid mixture of methanol and water. Plate 23 is shaped to include fluid channels 24 for passage of a quantity of gaseous oxygen (or air). Plate 23 is electrically conductive and in electrical contact with cathode 12. It can be used as a uni-polar plate (the positive terminal of the electrical current generated by the fuel cell unit) or a bi-polar plate.

In addition, this prior art fuel cell comprises a fuel permeation-controlling member (PCM, as in our earlier design) or vapor transport member 27 (VTM, as in Cropley's design) being positioned in front of the anode diffuser layer 10 (between anode diffuser 10 and the fuel distribution plate 21) and in physical contact with the fuel inside fuel channels 22. Since this VTM or PCM is not electrically conductive, the fuel distribution plate cannot serve as a current collector and, hence, a conductive tab 32 has to be attached to the diffuser layer. Furthermore, a fuel cell system is typically composed of a multiplicity of fuel cell units that are stacked together with the negative terminal (e.g., a current collector similar to plate 21) of a unit cell in physical and electronic contact with the positive terminal (e.g., a current collector similar to plate 23) of another unit cell so that effectively the unit cell units are electrically connected in series to form a fuel cell stack. A non-conductive VTM layer 27 essentially disrupts the electron path, making inter-cell connections very awkward and effectively increasing the contact resistance of the whole fuel cell system.

Figure 1B:
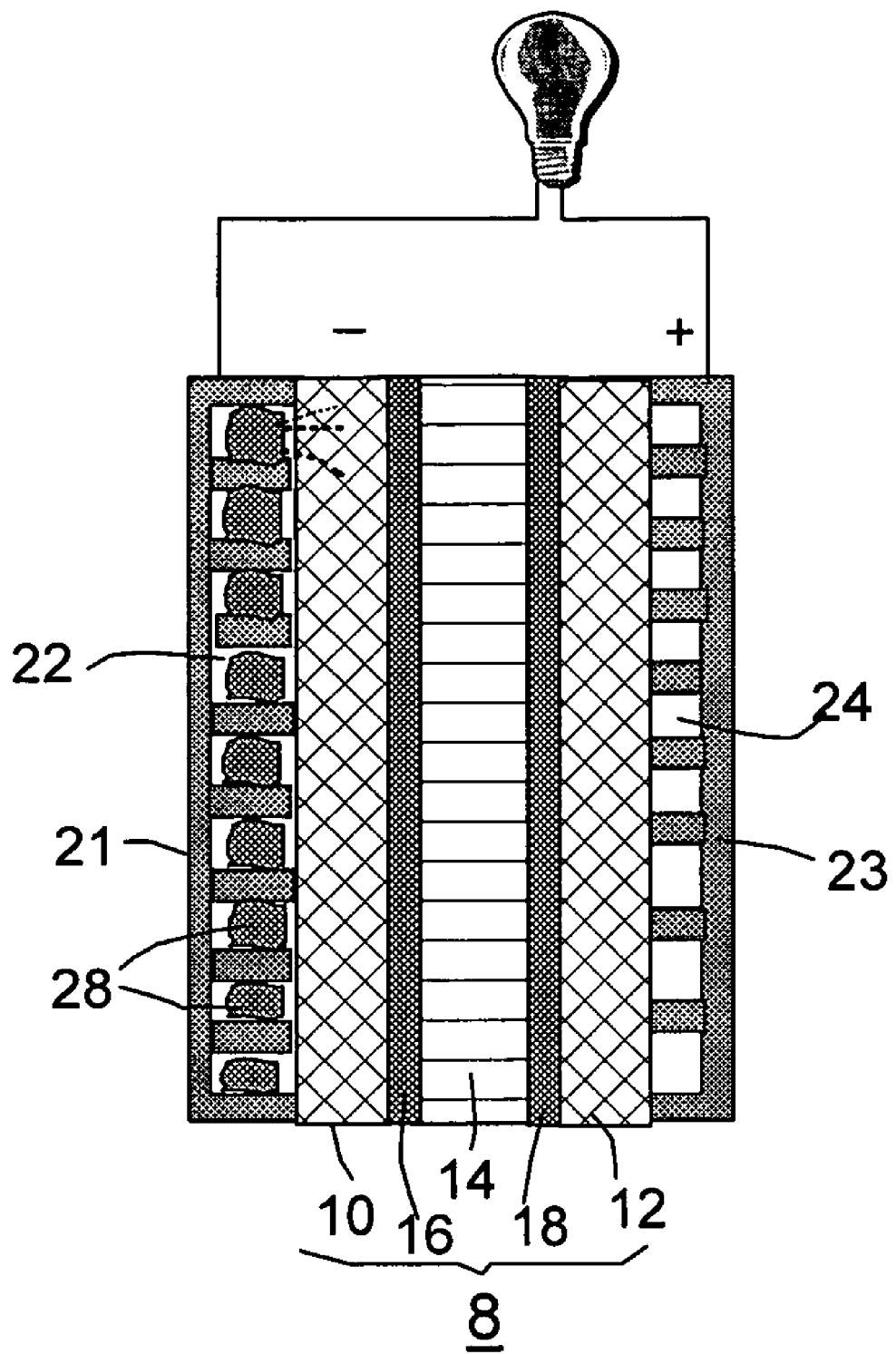

The presently invented controlled-release fuel cell overcomes the aforementioned shortcomings of prior art organic vapor fuel cells. As shown in FIG. 1(B), in one preferred embodiment of the present invention, a separate VTM or PCM layer is no longer needed. Instead, a controlled-release material 28 is positioned in the fuel flow channels 22. This controlled-release material is in fluid communication with a liquid fuel source and receiving the liquid fuel therefrom. This material absorbs liquid fuel and possibly gets swollen to a controlled extent to retain a desired amount of liquid fuel. When the fuel cell is not in operation, this amount of fuel is retained without a parasitic loss at room temperature or below an ambient temperature. When the fuel cell is in operation, heat is supplied to activate a vapor release process, allowing the fuel vapor to be delivered, typically through a gas diffuser layer 10, to the anode catalyst phase 16 at a well-controlled rate. The fuel cell is operated at a higher temperature (typically higher than 80° C., but preferably between 100 and 160° C.). The vaporous fuel oxidized at a higher temperature proceeds in a more efficient manner for proton generation. The needed heat may come partially from the electrochemical reactions occurring at the electrodes. Additional heat comes from a heating element positioned near the controlled-release material. During the start-up in real practice, an attendant battery (preferably a rechargeable one) or any other type of energy source may be operated to energize the heating element that generates the initial amount of heat sufficient to activate the vapor releasing procedure to trigger the operation of the fuel cell. Once the fuel cell begins to operate, it will generate more than enough electricity to not only power the external load but also recharge the battery. Since the electrochemical reactions proceed so efficiently, the amount of power needed to energize the heating element and recharge the battery represents but a very small fraction of the power that can be generated by the invented fuel cell.

Figure 2:
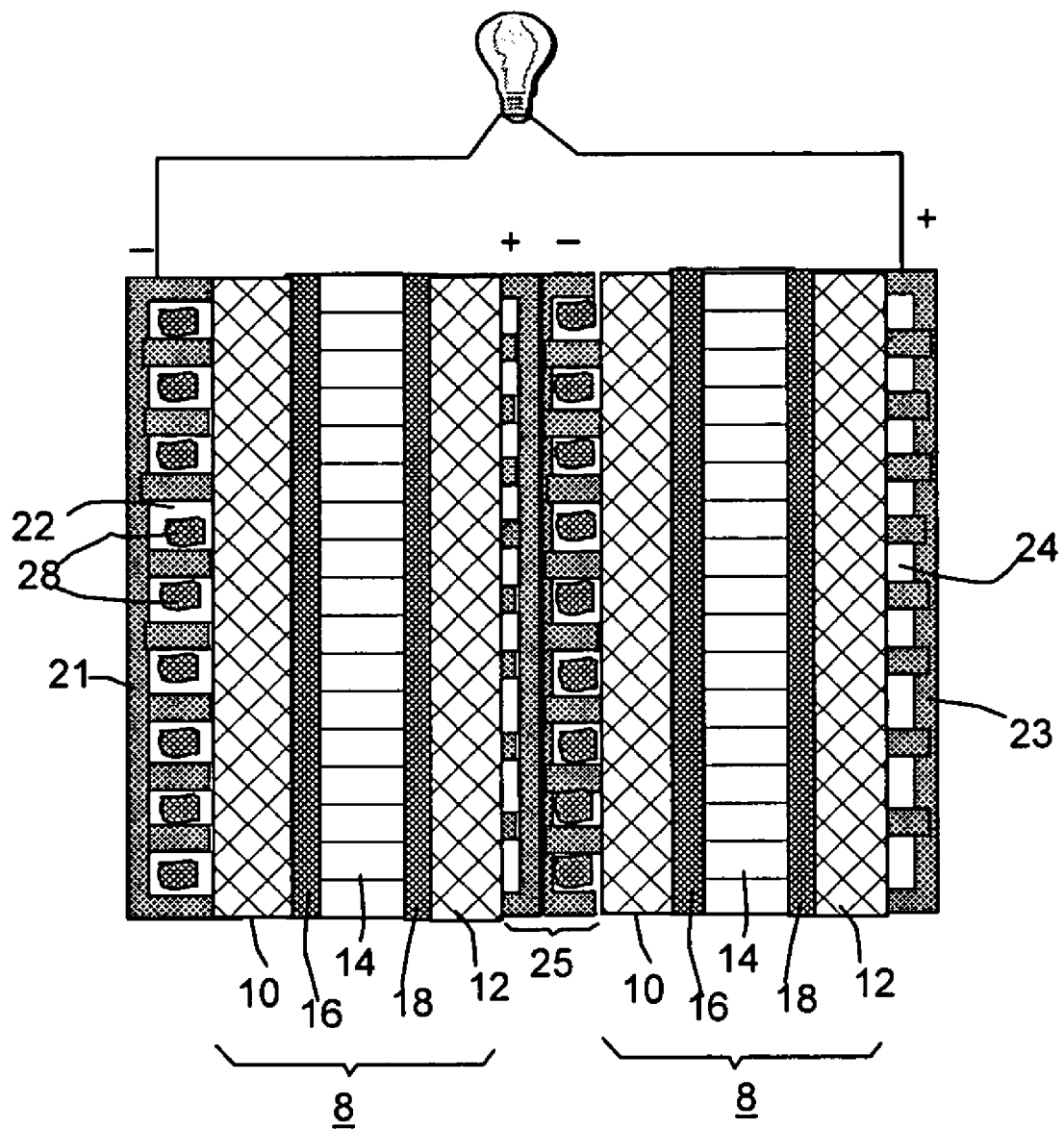
FIG. 2 Schematic of a fuel cell stack comprising two controlled-release organic vapor fuel cell units.

Since the controlled-release material is accommodated inside the channels 22 of a flow field plate 21 (which is electrically conductive), this material does not impede the flow field plate from contacting the gas diffuser plate 10. Hence, this plate also serves as a current conductor. As shown in FIG. 2, two or more fuel cell units can be stacked together with a bipolar plate 25 serving as a separator between two unit cells, making a perfect series connection. The bipolar plate can be just one single piece of conductive graphite or composite that is an integrated structure of plates 21 and 23 (instead of two separate pieces).

This fuel cell is particularly well-suited for use with methanol as its organic fuel, but is not limited to methanol. Other suitable organic fuels include, for instance, ethanol, propanol, isopropanol, trimethoxymethane, dimethoxymethane, dimethyl ether, trioxane, formaldehyde, formic acid or the like. Nevertheless, for ease of discussion, methanol is illustratively referred to herein as the organic fuel.

The fuel cell shown in FIG. 1(B) comprises a membrane electrode assembly 8, which comprises a proton exchange membrane 14 (PEM), an anode bonded to one face of proton exchange membrane, and a cathode bonded to the opposite face of PEM, 14. A commonly used PEM in fuel cells is perfluorinated sulfonic acids such as Nafion® from du Pont, which is normally used up to approximately 60° C. However, in the present invention, higher temperature polymers are preferred, including sulfonated poly (ether ether ketone), sulfonated poly (ether sulfone), sulfonated perfluoroalkoxy, polybenzimidazole, sulfonated polyimide, sulphonated polyamide-imide, sulfonated poly phenylene oxide, and copolymers and mixtures thereof. The anode preferably includes a backing layer 10 (e.g., carbon paper) and a platinum/ruthenium electro-catalytic film 16 positioned at the interface between the anode backing layer and PEM 14 for promoting oxidation of the methanol fuel. Similarly, the cathode preferably includes a backing layer 12 (e.g., carbon paper) and a platinum electro-catalytic film 18 positioned at the interface between the cathode backing layer and PEM 14 for promoting reduction of the oxidant.

Many other types of oxidation and reduction electro-catalysts may be used. For example, instead of a platinum/ruthenium oxidation electro-catalyst, one may use as the oxidation electro-catalyst (i) the combination of platinum and any other one or more metals from Groups IIIA, IVA, VA, IB, IIB, IIIB, IVB, VB, VIIB, VIIB, and VIIIB of the periodic table; (ii) metal oxides of the above-mentioned combination including reduced metal oxides of the combination; or (iii) mixtures and/or alloys thereof. Instead of a platinum reduction electro-catalyst, one may use as the reduction electro-catalyst metal oxides of platinum, including reduced metal oxides of platinum, or mixtures and/or alloys thereof. The oxidation or reduction electro-catalyst may be applied directly to the backing layer of its respective electrode or may be dispersed on a suitable catalyst support, such as a carbon, graphite or other electrically conductive support (e.g., nano-scaled carbon particles), which is in turn applied directly to the backing layer of its respective electrode. Other reduction electro-catalysts known to those skilled in the art, such as sodium platinate, tungsten bronzes, lead ruthenium oxides, lead iridium oxides, lanthanum oxide and macrocyclic or porphyrin structures containing one or more metals, could also be used.

In practice, the proton exchange membrane in a PEM-based fuel cell is typically coated on both sides with a catalyst (e.g., Pt/Ru or Pt) to form a catalyst-coated membrane (CCM). The CCM layer is then sandwiched between an anode backing layer (carbon paper or cloth) and a cathode backing layer (carbon paper or cloth). The resulting five-layer assembly 8 (FIG. 8(B)) is called a membrane electrode assembly (MEA). Although some fuel cell workers sometimes refer to CCM as a MEA, we prefer to take the MEA to mean a five-layer configuration: anode (or anode backing layer), anode catalyst layer, PEM, cathode catalyst layer, and cathode (or cathode backing layer). The electrodes (anode and cathode) of an MEA have several functions: 1) diffuse oxygen and fuel evenly across the surface, 2) allow water molecules to escape (principally a cathode-side issue), 3) hold back a small amount water to keep the membrane wet and efficient (cathode side issue), 4) catalyze the reactions, 5) conduct electrons so they can be collected and routed through an electrical circuit, and 6) conduct protons a very short distance to the proton exchange membrane. Both the water management and the electron conduction functions are satisfied with dual role diffusion layers (carbon paper or cloth) which are sandwiched over the catalyst layers. In practice, the diffusion layer can be integral to the current collectors, or a separate piece sandwiched between the current collector and the catalyst layer. In our preferred embodiment, the diffusion layer can be incorporated as part of the current collector or a separate piece.

Analogous to the prior art organic vapor fuel cell (FIG. 1(A)), the controlled-release fuel cell also comprises a pair of fluid distribution plates 21 and 23, which are positioned on opposite sides of membrane electrode assembly 8 (FIG. 1(B)). Plate 21, which serves as a fuel distribution plate, is shaped to define fuel channels 22 in which the controlled-release material is positioned. These channels face toward the anode diffuser plate 10 and, when activated, provide fuel vapor to plate 10 which uniformly distribute the fuel to the anode catalyst. In one preferred embodiment, channels 22 are designed to hold a quantity of a liquid mixture of methanol and water. An input port and an output port (not shown), being in fluid communication with channels 22, may also be provided in plate 21 so that carbon dioxide can be withdrawn from channels 22 and the fuel can be replenished.

Figure 3:
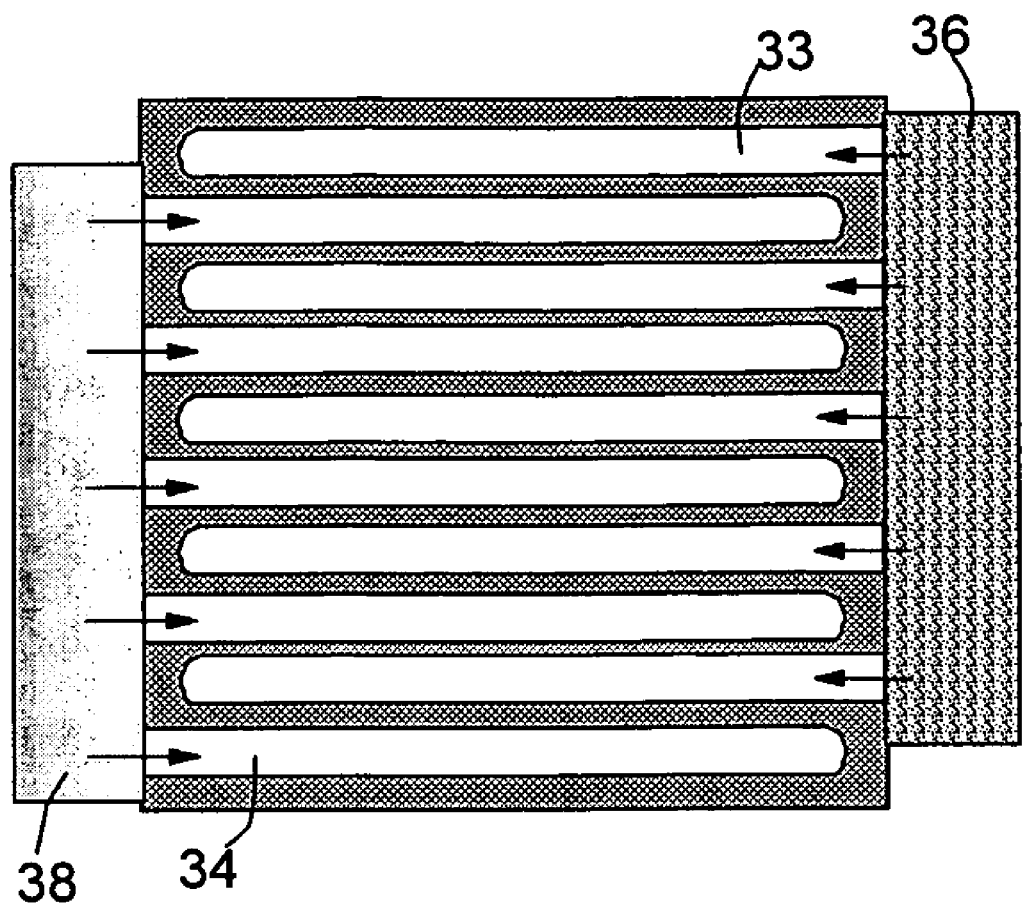
FIG. 3 A schematic showing the front surface of a fuel flow plate or bipolar plate. Two separate sets of channels 33, 34 accommodate two controlled-release material compositions (same or different chemical compositions) that are fed with water and organic fuel (e.g., methanol) from two respective fuel cartridges 36, 38.

In another preferred embodiment (FIG. 3), the channels are divided into two separate portions or zones, with one portion or zone 33 containing a first controlled-release material composition to absorb water only and the other portion or zone 34 containing a second controlled-release material composition to retain the organic fuel only (e.g., methanol). The two portions are fed with water and methanol separately from two respective fuel chambers or cartridges, 36 and 38. When heated, the two separate portions provide two or multiple streams of water and methanol vapors at desired flow rates, which are mixed and delivered through a gas diffuser plate (a version of a combined diffusion and mixing member) to the anode catalyst as a mixture. Such an arrangement allows for the replenishment of methanol and water on a separate basis. FIG. 3 schematically shows a front surface of a fuel flow field plate, which can be a bipolar plate if its opposite surface has oxidant flow channels for transporting air or oxygen.

Plate 23 is shaped to include oxidant fluid channels 24 for passage of a quantity of gaseous oxygen (or air). An input port and an output port (not shown) are provided in plate 23, which are in fluid communication with channels 24 so that oxygen (or air) can be transported to the cathode diffuser plate 12 through the input port and water and excess oxygen (or air) can be withdrawn from channels 24 through the output port. Plate 23 is electrically conductive and in electrical contact with the cathode diffuser plate 12. It can be used as a uni-polar plate (the positive terminal of the electrical current generated by the fuel cell unit) or as a bi-polar plate.

When a stack of multiple fuel cell units are desired, as is usually the case in real practice, plate 21 may be integrated with plate 23 to form one bi-polar plate (25 in FIG. 2), which contains both fuel fluid channels (similar to 22) and oxidant distribution channels (similar to 24) all in one integrated plate. Although FIG. 2 shows only two fuel cell units as an example, multiple bipolar plates may be interposed between individual fuel cell units to form a fuel cell stack, which, along with a frame, end plates, electrical connections, and control circuits could constitute a fuel cell system.

One feature or function of the fuel controlled-release material 28 is to separate or isolate the fuel in the fuel channels 22 from the anode diffuser plate 10 when the fuel cell is not in operation, normally at an ambient temperature (e.g., room temperature) or below. A second feature of material 28 is to allow the fuel to evaporate when it is heated to a temperature above an activation temperature $T_a$. The fuel controlled-release material 28 may be selected from any material that is capable of absorbing liquid organic fuel and/or water, retaining the fuel at or below a selected temperature (ambient temperature), but allowing a significant amount of fuel to escape in a vapor form at a temperature higher than another selected temperature (the activation temperature, $T_a$) at a desired rate. Accordingly, fuel controlled-release material 28 may be selected from a range of polymeric materials, ceramic materials, ceramic-supported polymers (hybrid materials), and composite materials. In many cases, the materials that are used as a permeation-controlling membrane, as in our pending U.S. patent application Ser. No. 11/257,528 (Oct. 26, 2005), can be used as a controlled release material (CRM). However, as opposed to being used as a separate membrane sheet, these CRMs are inserted inside the channels of a fuel flow field plate in the presently invented fuel cell.

One class of CRM is the pervaporation material. The conventional pervaporation material has been used primarily for separation of organic species through the mechanism of differential permeation. In one application of a pervaporation membrane, for instance, water from a contaminated organic stream is preferentially transported across a thin membrane film. The source side of the membrane is wetted with the water-containing organic liquid. A vacuum or a sweep gas is used on the sink side of the membrane to facilitate or promote water permeation through the membrane. The permeated water is collected from the sink side by condensation. In the present application, a pervaporation material is used because of its capability in absorbing and retaining water and/or methanol (or other organic or hydrocarbon fuels) at room temperature or below a desired ambient temperature. The material is further capable of emitting the fuel species in a vaporous form when the surrounding temperature and pressure conditions are conducive to evaporation. The material is not used in a membrane film form (as in a pervaporation process), but instead in a form (e.g., powder, thin fiber, strip, etc.) that can be placed in channels of a flow field plate.

In the conventional pervaporation process a liquid mixture is separated based on the preferential solubility and diffusivity of the components of the mixture through an active pervaporation membrane sheet. Similarly, in the present context, differences in solubility and diffusivity between water and methanol could result in different evaporating rates from a pervaporation material used as a controlled-release material. Hence, the water-to-methanol ratio of the fuel fed into the controlled-release material can be drastically different than that of the evaporated fuel. Clearly, it would be highly advantageous to deliver the methanol-water mixture to the anode catalyst site at a ratio that is consistent with the desired stoichiometric ratio as defined by the anode electro-chemical reaction. The controlled-release material may be a single material composition or a mixture of two or more compositions with one composition preferentially emitting water vapor at a desired rate and another emitting methanol at another desired rate.

Another class of CRM is the vapor permeable material. Vapor permeation is similar to pervaporation with one major difference—vapor, instead of liquid, contacts the source side of the membrane. However, we have found surprisingly that these materials could be soaked with liquid fuel at all practical temperatures and retain the fuel at ambient temperature. These CRMs can then be activated to emit fuel vapor at a higher temperature. The pervaporation or vapor permeation membrane itself is normally substantially non-porous, but the diffusion rate can still be highly temperature dependent since the diffusion coefficient of a molecule in a host material is temperature dependent. Hydrophilic polymers with an amorphous phase (such as in a semi-crystalline polymer) can hold therein a significant amount of water and/or methanol at room temperature. These polymers tend to exhibit a substantial vapor emission rate at a temperature above the glass transition point (Tg) and a minimal vapor emission rate below Tg. Organic species and/or water molecules presumably stay mostly in the amorphous phase, which is rigid and less permeable at a temperature lower than Tg (hence, it takes a longer time to absorb a maximum quantity of liquid fuel). When above Tg, the molecular chains in the amorphous phase become mobile with large-scale molecular segmental rotation or translation being possible, thereby facilitating diffusion and evaporation of low molecular weight molecules.

Yet another class of CRM is selected from the materials commonly used to make a micro-filtration or ultra-filtration membrane, e.g., ionomeric membranes used in reverse osmosis and ultra-filtration such as cellulose and polyamide. In micro-filtration or ultra-filtration, porosity is the key to preferential transport, and the flux rate depends upon molecular size. This implies that methanol and water molecules, being different in sizes, will permeate through the material at different rates. However, for the present application, we make use of these pores to absorb and retain the liquid fuel, which vaporizes at higher temperatures to provide fuel vapors to the anode catalyst. By contrast, in pervaporation or vapor permeation, molecular interaction between the membrane and separated species, rather than the molecular size, is the determining factor. If methanol is more affinitive (than water) to the pervaporation/vapor permeation material, methanol will wet the membrane better and enter the material at a faster rate. It is the chemical compatibility of the controlled-release material with the chemical species of interest that determines the absorption and evaporation properties of this specific species in the controlled-release material. The chemical composition of this material can be tailored to impart thereto desired water/methanol absorbing and evaporating rates.

In addition, thin hydrophilic polymer films may be deposited onto a highly porous support matrix (e.g. ceramic) or coated onto ceramic particles to make a ceramic-supported polymer or hybrid material. For instance, a hybrid silica-polyvinyl alcohol (PVA) material may be used as a controlled-release material. Miyosawa, in U.S. Pat. No. 4,016,129, described a coating comprising an aqueous dispersion of silica-PVA complex prepared by the reaction between colloidal silica dispersion and PVA solution.

For high temperature applications (100° C.-150° C., or higher), sulfonated versions of thermally stable polymers are particularly useful. Examples are sulfonated poly (ether ether ketone) (PEEK), sulfonated poly ethersulfone (PES), sulfonated perfluoroalkoxy, polybenzimidazole, sulfonated polyimide (PI), sulfonated polyamide-imide (PAI), sulfonated poly phenylene oxide (PPO), and copolymers and mixtures thereof. They are not only good proton exchange membrane, but also surprisingly good controlled-release materials for use in the present invention. Preferably, they are prepared in a porous structure like a foam, which works like a sponge. The foam is soaked with liquid fuel, which will is retained and prevented from flowing into the anode in a liquid form. When heated to a desired operating temperature, the fuel is evaporated at a desired rate.

Another particularly useful class of CRM is a hybrid structure that consists of a micro-porous support being impregnated and fully penetrated from the support's interior surface to its exterior surface, by an essentially non-porous solid organophilic polymer. A preferred organophilic polymer is an elastomer, preferably a silicone polymer. The main function of the micro-porous support is to reinforce the polymer, which essentially completely impregnates the support. This organophilic polymer may be more compatible with the organic fuel component (e.g., methanol) than water. In this case, a methanol-water mixture with a higher-than-stoichiometric molecular ratio (higher than one-to-one) may be fed to the fuel channels, but the evaporated fuel mixture may become stoichiometric for the anode electro-chemical reaction.

An excellent choice for the CRM is a polymer gel, which is a lightly cross-linked polymer network that can be swollen by a "solvent" (e.g., water and/or methanol) to a controlled extent. Examples include polyacryamide (PAAm), poly acrylic acid, graft copolymer of poly (methacrylic acid) (PMAA) and poly (ethylene glycol) (PEG), and several other lightly cross-linked polymers derived from water-soluble polymers. The polymer gel, when used as a CRM, can absorb a controlled quantity of liquid methanol and/or water from a fuel cartridge and releases the fuel in a vapor form, provided the temperature and vapor pressure of the anode side are favorable to vaporization.

The fuel controlled-release material 28 may take any of a number of different configurations. Examples of suitable configurations include, but are not limited to, string, thin strip, filament, hollow fiber, micro-porous hollow fiber, and fine particles, provided they can be readily held in place inside the channels 22 of a flow field plate.

In operation, the methanol-water mixture fuel is delivered to channels 22 of plate 21 (FIG. 1(B)) with liquid fuel coming in contact with the controlled-release material 28 and being retained therewith or therein. A small power source (e.g., a rechargeable battery, a small zinc-air battery, a small DMFC fuel cell, etc.) may be switched on to provide an initial amount of heat to the controlled-release material. With a temperature higher than the activation temperature $T_a$, the fuel evaporates from the material 28 and, thereafter, passes through a porous anode layer (e.g., carbon paper) in a vapor form. Preferably, the fuel cell is operated in such a way that the fuel that reaches the anode catalyst site is in a vaporous form at a relatively high temperature (100° C.-160° C.). At the anode catalyst site, oxidation of the fuel vapor occurs to form carbon dioxide (or other species for non-methanol fuel), protons and electrons. Carbon dioxide then diffuses back from the anode to plate 21 and exit through the exit port (not shown). The electrons generated at the anode flow through an external circuit to the cathode, producing an electrical current. The protons generated at the anode migrate across the proton exchange membrane 14 to the cathode where they react with the electrons conducted by plate 23 and oxygen (or air) that has diffused to the cathode catalyst after having been admitted into channels 24 of plate 23 through an inlet port (not shown). Water present at the cathode and any excess oxygen (or air) is then conducted back to channels 24 of plate 23 and is discharged through an exit port (not shown).

A thin metal wire, conductive fiber, Peltier junction device, or other micro heating element may be implemented at the anode side (e.g., near or in the flow field plate or the anode backing layer) to facilitate the evaporation process. A minute temperature sensor element (e.g., a thin thermocouple wire) may be placed inside the anode to monitor the catalyst phase temperature. Temperature monitoring and control devices or circuits are well-known in the art. Such a combined heating element-sensor arrangement is advantageous in that additional heat may be supplied to vaporize more fuel on demand (e.g., when needed, more current may be supplied to the external load by providing more vaporous fuel at a faster rate and allowing the reactions to proceed at a higher temperature). With such added adaptability, the fuel cell essentially becomes a smart, actively controlled power source. A simple logic circuit may be added as a part of the fuel cell voltage regulator or control circuit that is normally installed in a fuel cell for electronic device applications.

As indicated earlier, the heating means may comprise using a rechargeable battery to provide initial heating to begin the fuel cell operation. The battery can be recharged once the fuel cell begins its operation. The heating means may comprise feeding a fraction of the current generated by the controlled-release fuel cell to the heating element. The resulting improvement in power output from the fuel cell more than compensates for the small fraction of current rerouted to the heating element.

The liquid fuel source may be simple fuel cartridges that are detachable from the fuel cell proper, so that the fuel cell can be run for a prolonged period of time by intermittently replenishing the fuel via replacing the cartridge.

In another embodiment of the present invention, the fuel cell comprises fuel supply means that include multiple separate chambers or cartridges (e.g., 36 and 38 in FIG. 3) to accommodate the organic fuel (e.g., methanol) and water on a separate basis, not directly as a mixture. At least one chamber (e.g., 36) is used to accommodate the organic fuel and a second chamber (e.g., 38) is used to house water only. This arrangement allows for separate replenishment of organic fuel and water. The by-product water generated by the cathode reaction can be captured and fed back to the water chamber without varying the organic-water ratio in other chambers. Furthermore, the fuel controlled-release material may comprise multiple material compositions at different zones of a fuel flow field plate. For instance, FIG. 3 shows two zones represented by channels 33 and channels 34 that receive water and methanol, respectively, from cartridges 36 and 38. At a given operating temperature, these flow field zones provide desired flow rates of organic fuel and water into the anode side where organic fuel and water vapors mix at a desired ratio (preferably in a vapor diffusion and mixing member) prior to reaching the anode catalyst site. A controlled-release material composition can be tailored to give a desired water evaporation rate and another material composition tailored to give a desired organic fuel evaporation rate. The vapor diffusion and mixing member can be just a sheet of carbon paper or cloth.

Hence, another embodiment of the present invention is a fuel cell comprising: (a) a membrane electrode assembly (MEA) with the MEA comprising (i) a proton exchange membrane (PEM) having a front face and a rear face, (ii) an anode coupled to the front face, and (iii) a cathode coupled to the rear face of the PEM; (b) a vapor mixing and diffusion member positioned in front of the anode; (c) a controlled-release material (CRM) contained in channels of a flow field plate positioned in front of the vapor mixing and diffusion member with the CRM comprising a plurality of material compositions that absorb an organic fuel and/or water in a liquid phase but emit the organic fuel and/or water in a vapor phase; (d) fuel supply means comprising a plurality of fuel-feeding chambers corresponding to the plurality of channels and feeding a fuel thereto, wherein the feeding fuel in a first of the channels differs in composition from the feeding fuel in a second of the channels; and (e) means for electrically interconnecting the anode and the cathode through an external load.

In one preferred embodiment, the feeding fuel in the first chamber comprises essentially water only and the feeding fuel in the second chamber comprises essentially the organic fuel only. In another embodiment, the feeding fuel in the first chamber comprises an organic fuel-water mixture with X % organic and (1−X %) water, and the feeding fuel in the second chamber comprises an organic fuel-water mixture with Y % organic and (1−Y %) water, where $1 \leq X \leq 100$, $0 \leq Y \leq 100$, and $X \neq Y$. For instance, one chamber may contain a fuel with a high concentration of methanol (small proportion of water) and another chamber may contain pure water or water with a small amount of methanol.

The fuel cell typically also comprises an electrically-conductive, vapor mixing and diffusion member positioned between the flow field plate and the anode catalyst. The electrically-conductive flow field plate is in contact with the electrically-conductive vapor mixing and diffusion member, which is in turn in contact with the anode catalyst. Such an arrangement provides a continuous path for electron transfer to a negative terminal, possibly through the flow field plate. The vapor mixing and diffusion member may comprise a member selected from the group consisting of a metallic screen, porous metal sheet, carbon foam, carbon paper (preferred), carbon felt, carbon cloth, perforated metal, perforated carbon or graphite plate, perforated carbon or graphite composite, and combinations thereof. This vapor mixing and diffusion member, preferably just a sheet of carbon paper, may also be used as a current collector. Again, the anode preferably comprises an anode electro-catalyst film positioned at its interface with the proton exchange membrane and the cathode comprises a cathode electro-catalyst film positioned at its interface with the proton exchange membrane. A plurality of fuel cells may be connected in series, in parallel, or in both series and parallel, wherein at least one of the plurality of fuel cells is a fuel cell herein defined.

It is clear that a system comprising the invented fuel cell overcomes many of the shortcomings associated with conventional liquid feed and conventional vapor feed fuel cell systems in the following ways:

(1) As compared to conventional liquid feed systems, a system comprising the invented fuel cell does not involve having a liquid fuel mixture come into direct contact with the anode and thereby avoids the high fuel crossover rate and flooding commonly experienced in conventional liquid feed systems. This feature results in an increase in fuel efficiency.

(2) Because the fuel mixture can be delivered to the CRM at a much higher methanol-to-water ratio, a system comprising the invented fuel cell is capable of accommodating fuel mixtures having a greater methanol concentration than in a conventional liquid feed system. This increase in methanol concentration leads to a lower system volume and weight. In the case of multiple fuel chambers, one chamber can supply pure methanol and another chamber can supply pure water only to their respective zones of the fuel flow field plate (with different zones possibly featuring different CRM compositions). This configuration obviates the need for a large container to house a highly diluted methanol solution that is typically needed in a conventional DMFC. Further, feeding of methanol and water to the fuel flow field plate on a separate basis ensures a constant vapor mix ratio.

(3) As compared to vapor feed systems, a system comprising the presently invented fuel cell does not require the use of external equipment for heating the fuel mixture to a vapor state, the use of external equipment for heating and pressurizing the fuel cell, or the use of special cooling equipment.

(4) The present fuel cell design allows the fuel cell operating conditions and the fuel CRM composition to be tailored in such a manner that it provides organic fuel and water as needed for the electrochemical reaction. In this mode of operation, the fuel vapor will be consumed as it is produced, allowing very little fuel to permeate into and across the proton exchange membrane. Also, since vapor, rather than liquid water, is present at the anode-PEM interface, the net water drag to the cathode will be substantially lower than in a liquid system. These features again result in maximized fuel efficiency and minimized fuel crossover.

(5) The presence of a fuel-absorbing material such as a polymer gel enables the use of a very simple liquid fuel feeding mechanism, making the complete fuel cell system simple, compact, lightweight, and reliable since no liquid pump is needed.

To achieve a desired output voltage level, a number of these unit fuel cells can be stacked together to form a fuel cell assembly. A number of individual cells can be electrically connected in series by abutting the anode current collector of one cell with the cathode current collector of its nearest neighbor in the stack. Fuel and oxidant are introduced through manifolds into respective chambers. Hence, another embodiment of the present invention is a fuel cell stack that comprises at least two unit fuel cells as defined in earlier sections. These fuel cell units may be connected in series, in parallel, or a combination of both.

However, stacking and porting unit fuel cells may require complex flat stack arrangements and involve numerous parts (e.g., membranes, gaskets, channels, electrodes and bipolar plates) that may be difficult and expensive to fabricate and assemble. Traditional fuel cell stacks are highly prone to catastrophic failure of the entire system if a leak develops. The cost of fabricating and assembling fuel cells is significant, due to the materials and labor involved. In addition, it is difficult to transport the oxygen and fuel through the traditional stack, and increased gas or liquid transport requires pressurization, with attendant difficulties.

An alternative style of fuel cell has been recently proposed (e.g., Binder, et al., U.S. Pat. No. 5,783,324, Jul. 21, 1998 and Pratt, et al., U.S. Pat. No. 6,127,058, Oct. 3, 2000), which is a side-by-side configuration in which a number of individual cells are placed next to each other in a planar arrangement. This is an elegant solution to the problem of gas and fuel transport and mechanical hardware. However, a planar fuel cell configuration based on the conventional direct methanol fuel cell (DMFC) approach is still subject to the same problems associated with all DMFCs (e.g., fuel crossover, low fuel utilization efficiency, etc.). An improved planar fuel cell that is more fuel efficient would be a significant addition to the field.

Hence, another preferred embodiment of the present invention is a planar or co-planar fuel cell configuration that features the fuel controlled-release material (CRM) described above. A co-planar fuel cell, also referred to as a strip or segmented fuel cell, comprises several series-connected cells that are fabricated on the same continuous strip or sheet of membrane. Alternatively, separate pieces of membrane electrolyte, together with an anode on one side thereof and a cathode on the opposite side thereof, may be used for each cell.

In a planar fuel cell (e.g., FIG. 4), several anodes 52 are bonded to one side of a sheet of membrane electrolyte (or a plurality of individual electrolyte sheets on substantially the same plane) and are exposed to vapors of an organic fuel and water, which are evaporated from a controlled-release material (CRM) implemented in flow channels of a fuel flow field plate 56, which comprise a plurality of fuel distribution zones A, B, C, and D. Each zone contains flow channels that receive water and methanol separately or as a mixture. Water and methanol may be fed from a side of the plate 56 (where fuel cartridges are attached thereto) or from the top of a cover or casing 70 through one or more fuel access holes (e.g., 72a, 72b, 72c, and 72d). This CRM retains substantially all the amount of the absorbed organic fuel and/or water at or below an ambient temperature, but emits vapors of the organic fuel and/or water at a temperature higher than an activation temperature at a desired rate. Heating means are provided to heat the plate to a desired temperature. Heat can come from an electrochemical reaction in the fuel cell, a heating element implemented at or near the plate, or a combination of both.

Similarly, an equal number of cathodes 54 are bonded to another side of the electrolyte membrane sheet(s) directly opposite the anodes. The cathodes are exposed to the air, and air flow is achieved preferably by natural convection (e.g., for portable devices) or by use of a low pressure fan, blower or pump (e.g., for vehicles). Edge current collection and wires or cell interconnects are used to connect the individual cells in electrical series. Alternatively, cells or groups of cells may be connected in parallel. In real practice, each proton exchange membrane sheet is coated on both sides with a catalyst to form a catalyst-coated membrane (CCM). The CCM layer is sandwiched between an anode backing layer (carbon paper or cloth) and a cathode backing layer (carbon paper or cloth). The resulting five-layer assembly is called a membrane electrode assembly (MEA) unit.

Referring again to FIG. 4 as an example, the planar fuel cell contains an MEA member 50 (containing individual MEA units coinciding with zones A', B', C', and D') that is sandwiched between a current collector assembly 64 and a fuel distribution plate 56. The MEA member 50 in the planar fuel cell contains a plurality of anodes 52 disposed only on one side of the electrolyte sheet, and a plurality of cathodes 54 disposed only on the opposite side of the electrolyte sheet or PEM. The anode and cathode backing layers may contain or perform additional functions such as fuel vapor diffusion/ mixing and water management, respectively. When a plurality of anodes and cathodes are used, they are typically disposed on the solid electrolyte sheet in an array format, with each of the electrodes arranged such that they are associated with corresponding current collectors (e.g., the cathode at Zone A' corresponds to a current collector at Zone A", etc., but the current collector element at A" could be just the diffuser plate in contact with the cathode catalyst layer at A'). This configuration maximizes the active area of the electrolyte, because unlike prior art stacked fuel cells, where significant area around the perimeter of every MEA is dedicated to sealing and mounting, and unlike prior art planar fuel cells, where significant area is consumed by the need to seal the electrical connections as they penetrate the PEM, only the perimeter of the MEA member is needed to effect the seal, and no electrical connections are made through the MEA member.

Figure 4:
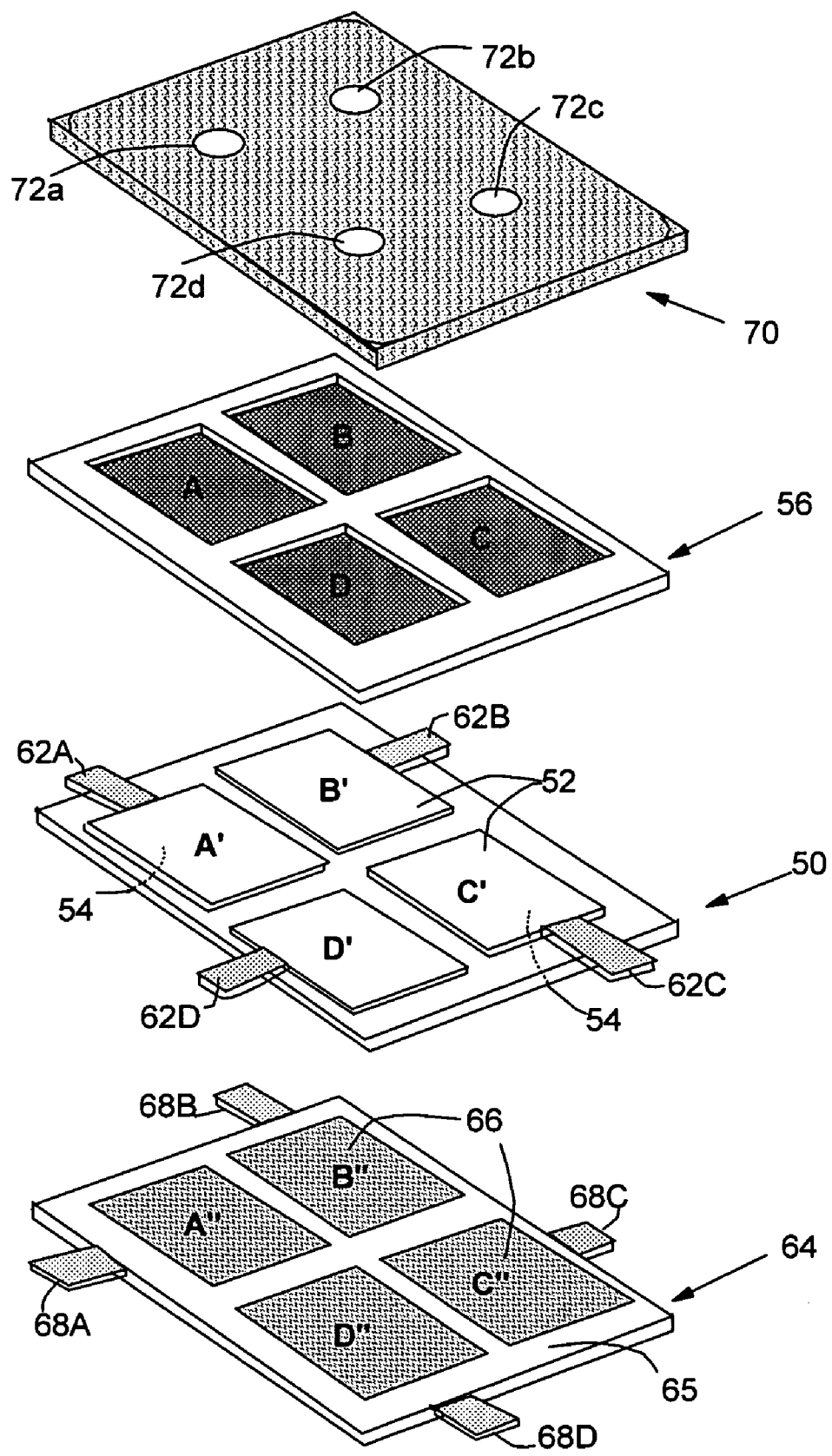
FIG. 4 An exploded isometric view (schematic) of a planar fuel cell in accordance with a preferred embodiment of the present invention, wherein the organic fuel and water are fed separately or as a mixture to the controlled release material at different zones of flow channels.

The current collector assembly 64 for the cathode side consists of an electrically insulating plastic frame 65 that contains a plurality of current collectors 66 embedded within the plastic frame. Each of the current collectors 66 has an interconnect means (e.g., 68A, 68B, 68C, 68B) appended thereto. As shown in FIG. 4, each anode (comprising preferably a carbon paper or cloth) has a tab (e.g., 62A, 62B, 62C, and 62B) connected thereto or integral therewith. The interconnect means serves to make an electrical connection to the exterior of the fuel cell, and is electrically connected to the current collector 66. Although the drawing depicts the interconnect means (e.g. 68A) as a tab, it can assume a variety of configurations, for example, a wire, as will be readily discernible to one of ordinary skill in the art. In one preferred embodiment, the current collectors 66 can be insert-molded into the plastic frame 65 with the interconnect means extending through the frame such that when the planar fuel cell is assembled, the current collector is within the perimeter of the MEA and the interconnect means is outside the perimeter of the MEA. One main advantage of this format is that the plastic frame 65 forms a gas tight integral seal around the interconnect means, thus eliminating the need to add other seals and/or gaskets. This novel approach provides for electrical connections between and within the fuel cell without traversing the thickness of the solid electrolyte sheet. No penetrations are made in the MEA, thus the solid electrolyte can be made in a single, continuous sheet, with all the anodes on one side and all the cathodes on the other side. There are no holes or apertures to seal, as in the prior art. This novel scheme allows the individual anodes and cathodes in each of the arrays to be placed very close together, thus utilizing a greater amount of the active area, as high as 95% of the total area of the current collector assembly. The individual anodes or cathodes can be spaced as close as 1 mm to each other.

A conventional planar fuel cell is typically composed of a membrane electrode assembly (MEA) sandwiched between two current collector assemblies. By contrast, in one embodiment of the present invention, no current collector assembly or only one assembly is needed, significantly reducing the bulkiness and complexity of the fuel cell system. The current collectors may be supported by a plastic frame, and they have an interconnect tab that provides an electrical pathway beyond the perimeter of the MEA. The interconnect tab can be connected to or integral with the corresponding anode or cathode. The interconnect tab is situated to provide electron transfer between the anodes and the cathodes such that preferably the interconnect tab does not traverse the thickness of the polymer electrolyte membrane. When the planar fuel cell is assembled, the interconnect tab is properly sealed to prevent leaking of fuel (e.g., organic fuel and water) or oxidant gases (e.g., oxygen or air).

In operation, the organic fuel and water can be fed from one or more fuel chambers or cartridges into different fuel distribution zones. In the case of separate organic and water feeding, when the organic fuel level or water level is low, one may just add the organic fuel or water to its respective fuel chamber. The evaporated water and methanol vapors are directed to uniformly mix together prior to reaching the anode catalyst layers through the anode diffusion layers at zones A', B', C', and D'. Other more sophisticated mixing strategies of methanol and water vapor delivery zones can be followed to ensure a uniform mixing of methanol and water vapors. Once evaporated, the two fuel species are mixed and diffused through anodes for oxidation to produce protons and electrons. In any case, the fuel is distributed to only one side of the membrane electrode assembly member 50 and oxidant is distributed only to the other side.

Conventional co-planar fuel cells are typically used for low power applications and operate at relatively low temperatures, generally below 60° C. By contrast, the presently invented planar fuel cell is normally operated at a higher temperature, generating much more power due to lower fuel cross-over, higher electro-catalytic activities, lower polarization, etc.

EXAMPLE 1

Polyurethane-Based Controlled-Release Material

Polyurethane (PU) was prepared by the reaction of toluene-2,4-diisocyanate with hydroxy-terminated oligomers. Oligomers were either liquid polybutadiene (MW 3000) or propylene oxide-based polyethers (MW 420 and 4800). Polyurethanes with linking segments formed predominantly by high-molecular-weight oligomers (MW 3000 or 4800) were rubbery materials with a glass transition temperature (Tg) lower than room temperature. By contrast, hard glassy membranes (Tg>room temperature) were obtained if the linking segments comprised high amounts of a polyether with MW 420. When a fuel mixture of water and methanol was fed to a glassy PU material (with or without pores, the latter being like in a foam or sponge), the fuel liquid is absorbed and retained at a T<Tg. At a temperature>Tg, all glassy PU materials allowed for evaporation of methanol at reasonable rates. In the cases of rubbery PU materials, minimal evaporation occurs at room temperature, but significant methanol evaporation occurs at 50° C. or above and significant water evaporation occurs at 80° C. or above.

EXAMPLE 2

Poly (Vinyl Alcohol)-Based Controlled-Release Material

Poly (vinyl alcohol) (PVA) can be modified to obtain phosphatic anionic PVA (P-PVA) and quaternary ammonium cationic PVA (C-PVA) with various degrees of substitution (D.S.). The polyelectrolyte complex membrane prepared by mixing P-PVA (D.S.=2.3%) and C-PVA (D.S.=2.9%) with weight ratio of 1/1, showed a good evaporation rate at 75° C. or above. Additionally, cross-linked PVA material was prepared with poly (acrylic acid-co-maleic anhydride) (PAAM) serving as a polymeric cross-linking agent. Cross-linked materials were characterized by good water and methanol swelling and evaporation capabilities. Swelling ratio decreased with increasing cross-linking agent content since the swelling of water molecule is restricted by chemical cross-linking between PVA chains and polymeric cross-linking agent chains and physical cross-linking by entanglement between the chains. When the contents of cross-linking agent increased, evaporation flux decreased for the aqueous ethanol solution. Cross-linked PVA was found to be particularly suitable for use as a controlled-release material. At temperatures lower than 75° C., slightly lower than its glass transition range of 80-85° C., both water and methanol evaporation rates were low. Both rates were significantly higher when the member temperature was higher than 85° C.

Poly (vinyl alcohol)(PVA)/poly(acrylic acid)(PAA) and PVA/sulfosuccinic acid (SSA) material performances have also been studied for the evaporation of water/methanol (MeOH) mixtures with varying operating temperatures, amount of cross-linking agents, and feed compositions. For PVA/PAA membranes, the evaporation rate was affected by the structural changes of the materials due to the cross-linking and the free carboxylic acid group also played an important role in the fuel abosorbing characteristics through the hydrogen bonding with PVA and the feed components leading to the increase of flux.

EXAMPLE 3

Methanol Selective Controlled-Release Materials

Polymeric membranes with excellent chemical resistance were prepared from polar polymers including NBR (Acrylonitrile-Butadiene Rubber) and Poly (vinyl chloride). These materials were cross-linked to form chemically and mechanically robust materials, which were all more capable of emitting methanol than water vapors. The permeation rates were negligible at room temperature, but become appreciable at 60° C. or higher.

The evaporation performance of polymer blends made from cellulose acetate and cellulose acetate hydrogen phthalate were also studied. All the tested material compositions were found to evaporate methanol preferentially. The selectivity increases and the evaporation rate decreases with increasing cellulose acetate content in the blend. When the feed temperature or the methanol content in the feed increases, the evaporation rates of a material with a 30 wt % in cellulose acetate are greatly enhanced and the selectivity decreases. However, the temperature effect is more significant at low methanol content in the feed and becomes negligible at high methanol content in the feed where plasticity effects prevail. This blend was particularly useful for separate evaporation control of water and methanol fuel, fed to different zones of the fuel distribution plate at 45-100° C. Different zones could have different cellulose acetate contents.

EXAMPLE 4

Ceramic-Supported CRMs

Ceramic-supported polymer CRMs can be prepared through surface modification of a ceramic support matrix or powder by a graft-polymerization procedure. One useful procedure consists of silylation of surface hydroxyls, which provides the anchoring sites for the grafted chains, followed by a free radical graft polymerization reaction. This procedure allows for the attachment of either hydrophilic or hydrophobic polymers. The chemically attached polymer phase serves to allow evaporation of the selected compound while preventing others from passing through the membrane. Poly (vinyl pyrrolidone) (PVP) and poly (vinyl acetate) (PVAc) were grafted to porous silica substrate to obtain PVAc-silica and PVP-silica membranes, respectively. Both were found to be effective in resisting permeation of water, allowing preferential permeation of organics, including both ethanol and methanol. The mass transfer process appears to be controlled essentially by the boundary layer near the membrane surface. This boundary layer comprises the attached functional polymers that are more affine to one selected target permeating species (e.g., methanol) than others (e.g., water).

EXAMPLE 5

CRMs from Thermally Stable Polymers

For high temperature applications (100° C.-150° C., or higher), sulfonated versions of thermally stable polymers are particularly useful. Examples are sulfonated poly (ether ether ketone) (S-PEEK) and sulfonated poly ethersulfone (S-PES) that exhibit relatively high permeability to both water and methanol, although unsolfonated PEEK and PES are essentially impermeable to both water and methanol. At room temperature, the permeation rates of both water and methanol are low (hence very little parasitic loss when the fuel cell is not in operation), but become appreciable at 60° C. and relatively high at 100° C. These rates were found to be sufficient to sustain a steady operation of presently invented fuel cells.

Figure 5A:
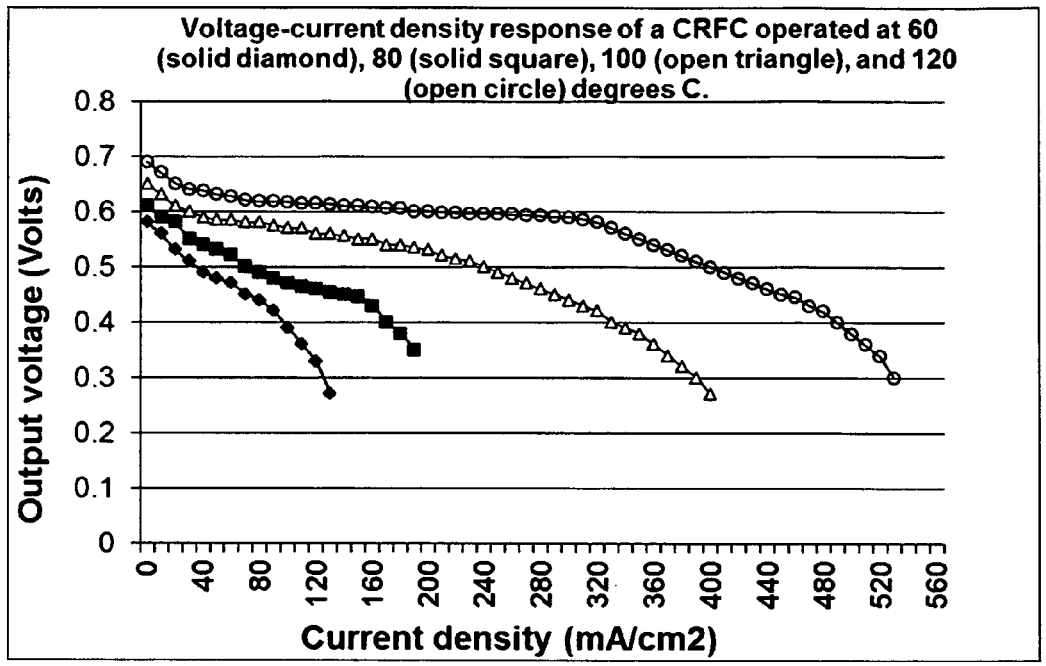
FIG. 5 (A) Current-voltage responses of selected controlled-release fuel cells tested as a function of temperature; (B) Power-current density response of the same fuel cells.
Figure 5B:
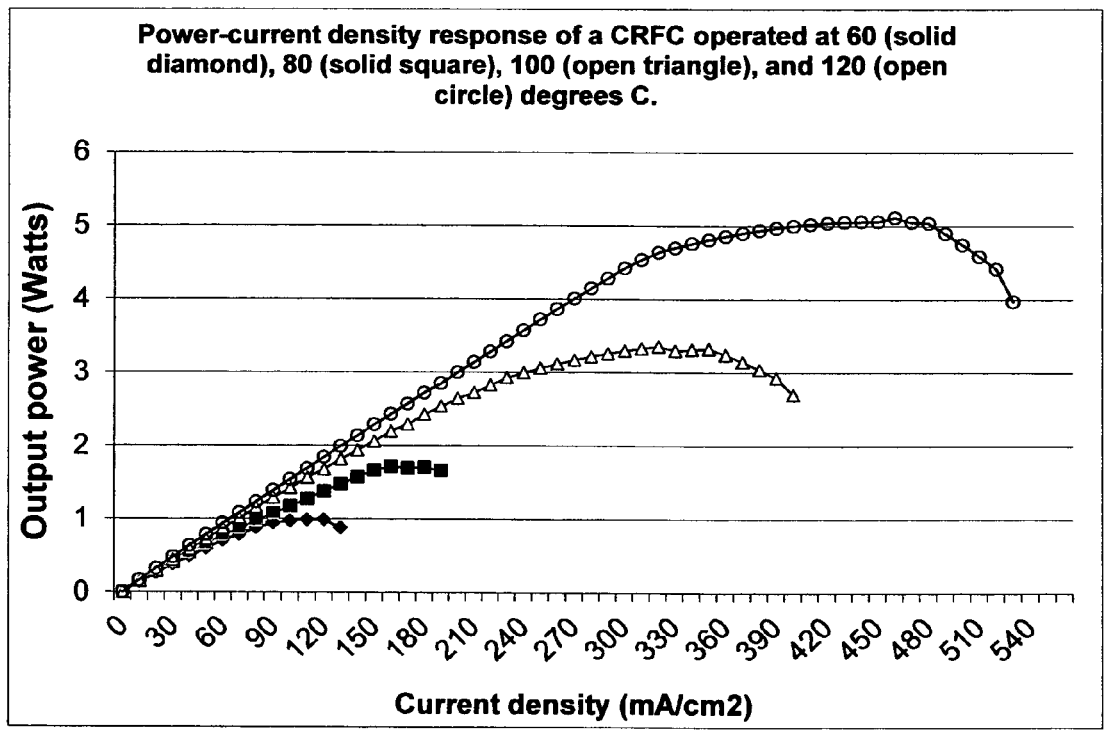

FIG. 5(A) and FIG. 5(B) show the output voltage and power, respectively, of four methanol-water fuel cells fabricated in accordance with the present invention. S-PEEK was used as both the controlled-release material and the proton exchange membrane. These data clearly demonstrated the superior performance of the presently invented organic vapor fuel cells when operated at a relatively high temperature. The extra power generated (due to much improved fuel utilization efficiency, reduced fuel crossover, greater electro-catalytic activities, and lesser polarization), has more than compensated for the required heating to sustain a high operating temperature. At 120° C., less than 3% of the generated power was used for auxiliary heating, yet the maximum power generated at this temperature is five times higher than that at 60° C.

It may be noted that, although the examples given herein are based on the methanol-water mixture as the liquid fuel, the presently invented fuel cell is not limited to this particular type of fuel. The present fuel cell can operate on any organic fuel that has a high hydrogen content (e.g., ethanol and propanol) and can be fed in a liquid form into the fuel chamber and then converted to become a vapor prior to reaching the anode catalyst phase.

The invention claimed is:

1. A controlled-release fuel cell, which is composed of:
   (a) a proton exchange membrane having a first surface and a second surface, a fuel electrode or anode being coupled to said first surface, and an oxidant electrode or cathode being coupled to said second surface;
   (b) a fuel flow field plate having surface channels positioned in front of said anode, said channels containing therein a controlled-release material that absorbs a liquid fuel and retains said liquid fuel at or below an ambient temperature, but releases said fuel in a vapor form at a temperature higher than an activation temperature to deliver a fuel vapor to said anode;
   (c) heating means in heat-supplying relation to said controlled-release material to activate fuel vapor release at a desired rate on demand; and
   (d) fuel supply means that feeds said liquid fuel to said controlled-release material.

2. The fuel cell as defined in claim 1, wherein said fuel comprises an organic or hydrocarbon fuel material selected from the group consisting of methanol, ethanol, propanol, formic acid, isopropanol, trimethoxymethane, dimethoxymethane, dimethyl ether, trioxane, formaldehyde, and combinations thereof.

3. The fuel cell according to claim 2, wherein said fuel further comprises water that is fed to said controlled-release material separately from said organic fuel material or as a mixture with said organic fuel material.

4. The fuel cell according to claim 1, wherein said heating means comprises receiving heat produced by an electro-chemical reaction of the fuel cell.

5. The fuel cell according to claim 1, wherein said heating means comprises receiving heat generated by a heating element implemented in the fuel cell.

6. The fuel cell according to claim 1, wherein said controlled-release material comprises a polymer gel.

7. The fuel cell according to claim 3, wherein said controlled-release material comprises a first material composition that preferentially retains and releases water and a second material composition that retains and releases said organic fuel.

8. The fuel cell according to claim 7, wherein said controlled-release material comprises a water-absorbing material and an organic fuel-absorbing material.

9. The fuel cell according to claim 1, wherein said controlled-release material comprises a material composition selected from the group consisting of a pervaporation material, vapor-permeating material, micro-filtration or ultra-filtration material, polymer containing an amorphous phase, lightly cross-linked polymer or polymer gel, ceramic-supported polymer material, composite material, and combinations thereof.

10. The fuel cell according to claim 1, wherein said organic fuel and water are supplied as a mixture at a first organic-to-water ratio to said controlled-release material and said fuel vapor is released at a second organic-to-water ratio, which is different from said first ratio.

11. The fuel cell according to claim 10, wherein said organic fuel is methanol and said second ratio is approximately one-to-one on a molecular basis.

12. The fuel cell according to claim 1, further comprising means for electrically interconnecting said anode and said cathode through an external load.

13. The fuel cell according to claim 1, wherein said fuel supply means comprises multiple separate chambers to accommodate said organic fuel and water separately or as a mixture.

14. The fuel cell according to claim 13, wherein said controlled-release material comprises a plurality of compositions distributed in a plurality of fuel distribution zones on said flow field plate.

15. The fuel cell according to claim 14, wherein a first zone accommodates said organic fuel and a second zone accommodates water.

16. The fuel cell according to claim 1, further comprising a temperature sensor to monitor the temperature of said controlled-release material.

17. The fuel cell according to claim 1, further comprising a temperature control device to regulate the temperature of said controlled-release material.

18. The fuel cell according to claim 1, wherein said heating means comprises using a rechargeable battery to provide initial heating to begin a fuel cell operation.

19. The fuel cell according to claim 5, wherein said heating means comprises feeding a fraction of the current generated by said fuel cell to said heating element.

20. A plurality of electrically connected fuel cells, at least one of said fuel cells being a fuel cell as defined in claim 1.

21. The plurality of electrically connected fuel cells as defined in claim 20, wherein said fuel cells are connected in parallel, in series, or a combination thereof.

* * * * *